No. 677,952. Patented July 9, 1901.
W. H. CARTWRIGHT.
EDUCATIONAL APPLIANCE.
(Application filed Jan. 29, 1901.)
(No Model.)
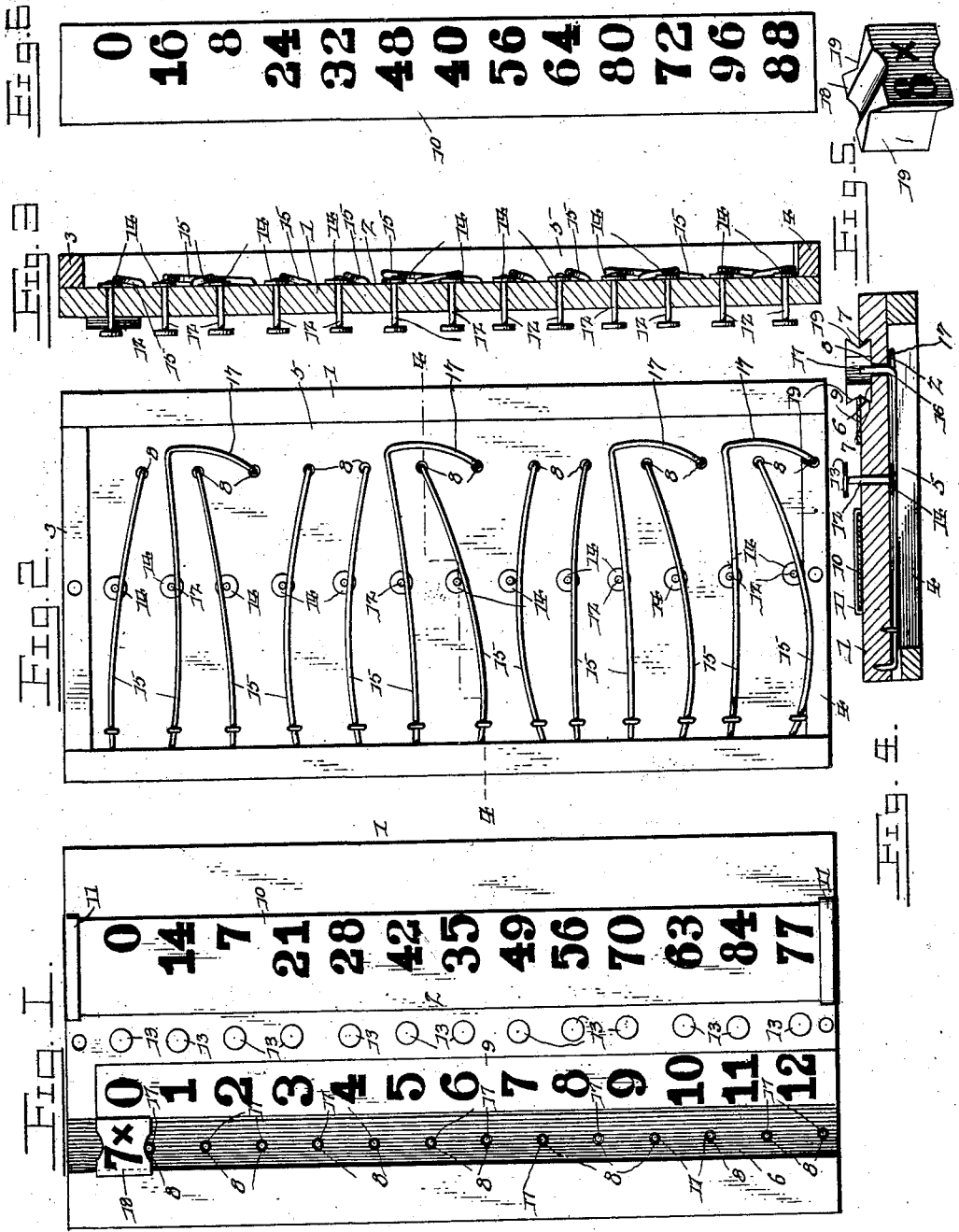
Witnesses
F. E. Alden
Chas. S. Hyer
W. H. Cartwright, Inventor
by C. A. Snow & Co.
Attorneys

UNITED STATES PATENT OFFICE.

WILLIAM H. CARTWRIGHT, OF BLAKELEY, MINNESOTA.

EDUCATIONAL APPLIANCE.

SPECIFICATION forming part of Letters Patent No. 677,952, dated July 9, 1901.

Application filed January 29, 1901. Serial No. 45,220. (No model.)

*To all whom it may concern:*

Be it known that I, WILLIAM H. CARTWRIGHT, a citizen of the United States, residing at Blakeley, in the county of Scott and State of Minnesota, have invented a new and useful Educational Appliance, of which the following is a specification.

This invention relates to an educational appliance, and particularly to an arithmetical board or device; and the object of the same is to provide a simple and effective means for assisting a scholar or student in ascertaining with accuracy a thorough knowledge of the fundamental principles of arithmetic and, while employing mechanical means to attain this end, overcoming any tendency toward a mechanical education or one where the scholar or student may be trained to depend on a precise arrangement in order to acquire a desired result by causing the use of thought and the faculties generally in conjunction with the mechanical parts of the improved device to ascertain the correct result or answer to the addition, subtraction, or multiplication of the several numerals disposed in different and related positions on the board.

The invention consists in the construction and arrangement of the several parts, which will be more fully hereinafter described and claimed.

In the drawings, Figure 1 is a front elevation of the improved device arranged for solving one of the multiplication-tables. Fig. 2 is a rear elevation of the improved device. Fig. 3 is a transverse vertical section through the board. Fig. 4 is a horizontal section through the board looking downwardly and taken on the line 4 4, Fig. 2. Fig. 5 is a detail perspective view of one of the number-blocks and as compared with that shown by Fig. 1 illustrating its reversibility. Fig. 6 is a detail elevation of one of the removable and replaceable strips and the same as that shown by Fig. 1 in reverse position to illustrate the double use of the same.

Similar reference characters are employed to indicate corresponding parts in the several views.

The numeral 1 designates the body of the board, which has a substantially smooth face 2 at the front and rear side and upper and lower end strips 3 and 4 to form a rear recess 5. This board is adapted to be fastened to a suitable support for convenience in operation by the student or scholar, and adjacent to the left-hand side thereof is a groove 6, extending through the top and bottom and having dovetailed side walls 7. Centrally lined in the said groove and spaced apart at regular intervals are a plurality of vertical openings 8, extending completely through the board in a transverse direction, as shown by Fig. 2, and along the right edge of the said groove on the face 2 a numeral-strip 9 is fixed and has a "0" at the head thereof and the numerals from "1" to "12" below the same descending in regular arithmetical succession. On the right side of the face 2 of the board a product-strip 10 is reversibly and removably mounted and adapted to be replaced by another of a similar character, the opposite ends of the said strip being held in suitable clips or other devices 11 to dispose said strip in operative relation to the strip 9. The opposite sides of the strip 10 have a series of product-numerals arranged thereon in a promiscuous manner or in accordance with a system of operation which will be presently described. The numerals on one side of the strip 10 represent the products of one multiplication-table and those on the opposite side the products of another table. Other strips bearing different products for use with other tables may be substituted for that shown, as desired, and in the arrangement of the strip 10, as shown by Fig. 1, the products relate to the "7" table, and on the reverse side of the same strip, as shown by Fig. 6, the products relate to the "8" table.

Between the strips 9 and 10 a series of vertically-alined push-pins 12 are mounted in the board and are supplied with outer heads 13 and rear circular flanges 14, located in the recess at the back of the board, there being as many of the said pins as there are characters on the said strip 9 and products on the strip 10. The rear flanges 14 are in continual operative engagement with spring-arms 15, located in the recess at the back of the board, and have the one extremity of each secured to the board and the opposite extremity bent at an angle to form a stop 16, the said stops being freely movable through the openings 8 and normally projecting in advance of the plane of the front face of the groove 6. When the pins 12 are pushed rearwardly, the arms are moved back and the stop ends 16 thereof are withdrawn rearward to clear the front face of the groove. Some of the arms also have depending angular extensions 17, from which the stops 16 terminally project, and these arms, with the extensions, are arranged in alternation between others that are regularly disposed to break the alined sequence of the supports 16 relatively to the pins 12, so that the second, sixth, and tenth arms, counting from the uppermost one, respectively carry the third, seventh, and eleventh stops 16, and the twelfth arm, also having an extension, carries the thirteenth stop and the thirteenth arm at the bottom the twelfth stop. This irregularity of the arrangement of the arms forces the scholar or student to exercise thought in arriving at the result sought instead of mechanically depending on a regular sequential arrangement of the arms and stops, and to encourage thoughtful study the products on the strips 10 are promiscuously arranged and correspond to the irregular arrangement of the stops, as set forth.

With the improved board a series of blocks 18 are employed and formed with angularly-grooved sides 19 to engage the dovetailed side walls of the groove 6, the said blocks being also formed with upper and lower center grooves or transversely-extending concavities to form seats for the stops 16. The blocks are thicker than the depth of the groove 6 and reversible, and on one face have a "7" and multiplication-sign and on the other face an "8" and similar sign, as shown, and thus be doubled up to include all the numbers of the twelve tables, and thereby require the use of but six blocks with obvious reduction of expense of manufacture and less liability to loss or misplacement. The blocks are freely movable in the groove 6 and reversible at will, and in changing the blocks to bring a different table into operative adjacency to the numeral-strip 9 the product-strip 10 will also be changed correspondingly.

When the block carrying the desired table-number is entered at the upper end of the groove 6, it falls until it contacts with the first stop 16, at which point the number "7," as shown, will be opposite the "0" on the strip 9. The student or scholar then reads seven multiplied by cipher equals cipher, found in transverse alinement with the block on the strip 10. He then pushes the head of the first pin 12 in a rearward direction to clear the first stop 16 from the lower edge of the block, and the latter falls to the second stop and directly opposite the numeral "1" on the strip 9 and then reads seven multiplied by one equals seven, and looks to discover the said product and finds that it is not opposite the block, but below the same. The third pin 12 is then pushed rearward to clear the block from its holding-stop, and the said block then falls to the third stop in alinement with the numeral "2" on the strip 9 and the product "7" on the strip 10. The student then reads seven multiplied by two equals fourteen and looks for the said product and finds it is above the position or level of the block, and having discovered that the third pin 12 controls the second stop he again presses said third pin and moves the block up in line with "12" on the product-strip. An endeavor will then be made to bring the block down opposite the numeral "3" on the strip 9, and naturally the third pin 12 will be pressed to clear the block and allow it to fall to the third stop and opposite the numeral "12," as before. The student will be puzzled for a time as to how the block can be released from its contact with the third stop until a discovery is made that the second pin 12 controls said latter stop, and after releasing the block by this means and allowing it to fall to the fourth stop opposite the numeral "3" on the strip 9 he will read that seven multiplied by three equals twenty-one, in a direct transverse line on the product-strip, and the pins run regularly to control the stops 16 opposite the numerals "3" and "4" on the strip 9, and below the latter the same irregular operation is pursued as before, and so on at intervals to the bottom of the board or through the whole series of numerals on the said strip 9.

Instead of having the multiplication-tables in operation on the board by the means set forth obvious changes can be made to convert it for use in addition, subtraction, and division, and different sets of blocks and product-strips will be furnished with each complete board, and, if desired, the strip 9 may be replaced by a different one.

After one block has reached the bottom of the groove 6 another may be entered at the top of the groove and bear a different number and the strip 10 changed to correspond thereto.

While the preferred form of the device has been shown and described, it is obviously apparent that changes in the form, size, proportions, and minor details may be resorted to without departing from the principle of the invention.

Having thus described the invention, what is claimed as new is—

1. An educational appliance comprising a board having a single straight groove adjacent to one side edge thereof, a block gravitatingly mounted in said groove and carrying a single character on one face, movable means for positively holding the block at different elevations, a strip adjacent to said block having characters thereon and an answer-strip to coact with said block and the characters on the strip adjacent to block.

2. An educational appliance comprising a vertical board having a single straight groove adjacent to one side edge and extending full length thereof, a block gravitatingly mounted in said groove and carrying a single character on one face, movable means for positively holding the block at different elevations and causing the same to have a step-by-step operation, a character-strip adjacent to said groove the latter being removable and reversible, and a removable and reversible answer-strip located adjacent to the side edge of the board opposite that adjacent to which the groove is formed.

3. An educational appliance comprising a body or board having a groove, a series of retractable stops projecting through the grooved portion of the board, a block carrying a number and removably mounted in said groove to engage the stops, a product-strip for the block, and an intermediate numeral-strip.

4. An educational appliance comprising a body or board, a block slidably mounted in said board, a plurality of movable stop devices to engage the block, and strips having numerals thereon, the block having a number thereon to coact with those of the strips.

5. An educational appliance comprising a body or board, a plurality of spring-arms having terminal angular stops projecting through a portion of the body or board, pins for individually operating said arms, a block carrying a number removably mounted in the said board and having a slidable movement under control of the said stops, a numeral-strip adjacent to the said block, and a product-strip to coact with said block and numeral-strip.

In testimony that I claim the foregoing as my own I have hereto affixed my signature in the presence of two witnesses.

WILLIAM H. CARTWRIGHT.

Witnesses:
A. J. IRWIN,
WILLIAM D. MCCARTHY.